United States Patent
Barth et al.

(10) Patent No.: US 6,229,577 B1
(45) Date of Patent: May 8, 2001

(54) AMBIENT LIGHT-DEPENDENT VIDEO-SIGNAL PROCESSING

(75) Inventors: Paul J. Barth; Michel W. Nieuwenhuizen, both of Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/112,888

(22) Filed: Jul. 9, 1998

(30) Foreign Application Priority Data

Jul. 14, 1997 (EP) .................................. 97202202

(51) Int. Cl.⁷ ...................................... H04N 5/58
(52) U.S. Cl. ..................... 348/602; 348/603; 348/604; 348/607; 348/227
(58) Field of Search .................... 348/602, 603, 348/227, 229, 604, 607; 382/274; H04N 5/58, 5/57

(56) References Cited

U.S. PATENT DOCUMENTS

| 3,165,582 | * | 1/1965 | Korda | 348/602 |
|---|---|---|---|---|
| 3,814,852 | * | 6/1974 | Mierzwinski | 348/602 |
| 4,181,915 | * | 1/1980 | Lagoni | 348/602 |
| 5,087,973 | | 2/1992 | Kawahara | 358/167 |
| 5,532,848 | * | 7/1996 | Beretta | 348/602 |
| 5,537,071 | | 7/1996 | Jaspers | 327/346 |
| 5,734,746 | | 3/1998 | Jaspers | 382/169 |
| 5,754,682 | * | 5/1998 | Katoh | 348/602 |
| 5,757,438 | * | 5/1998 | Yoon et al. | 348/603 |
| 5,831,686 | * | 11/1998 | Beretta | 348/602 |

FOREIGN PATENT DOCUMENTS

| WO9006035 | 5/1990 | (WO) | H04N/5/16 |
|---|---|---|---|
| WO9418790 | 8/1994 | (WO) | H04N/5/58 |

* cited by examiner

Primary Examiner—Michael Lee
Assistant Examiner—Jean W. Désir
(74) Attorney, Agent, or Firm—Edward W. Goodman

(57) ABSTRACT

In an ambient light-dependent video-signal processing method including the steps of measuring (LDR) an amount of ambient light to obtain a measured amount of ambient light, and processing (VSP) a video signal in dependence upon the measured amount of ambient light, the video signal is substantially immediately processed when there is a large change in the measured amount of ambient light, while the video signal is delayed being processed until an occurrence of a scene change in the video signal when there is a small change in the measured amount of ambient light.

10 Claims, 1 Drawing Sheet

AMBIENT LIGHT-DEPENDENT VIDEO-SIGNAL PROCESSING

BACKGROUND OF THE INVENTION

1. Field of the Invention

The invention relates to ambient light-dependent video-signal processing, and to a display apparatus featuring ambient light-dependent video-signal processing.

2. Description of the Related Art

PCT International Application No. WO-A-94/18,790 discloses an environment-dependent automatic luminance control for display screens, providing the possibility of automatically and continuously adjusting the luminance of the display screen to the average luminance in the user's field of view. The display screen is coupled to an external light sensor which can be placed individually anywhere in the room and is adjusted in such a way that the spatial angle covered roughly corresponds to the user's field of view. An electronic control built into the display or connectable thereto via an interface ensures that the brightness, contrast or background illumination of the display screen is adjusted so that the luminance of the display screen is in the best possible relationship with the average luminance in the field of view.

SUMMARY OF THE INVENTION

It is, inter alia, an object of the invention to provide a better ambient light-dependent video-signal processing. To this end, a first aspect of the invention provides an ambient light-dependent video-signal processing method comprising the steps of measuring an amount of ambient light to obtain a measured amount of ambient light; and processing a video signal in dependence upon said measured amount of ambient light; wherein said processing step includes the steps of substantially immediately processing said video signal when there is a large change in said measured amount of ambient light; and delaying processing said video signal until an occurrence of a scene change in said video signal when there is a small change in said measured amount of ambient light.

A second aspect of the invention provides an ambient light-dependent video-signal processing device comprising means for measuring an amount of ambient light to obtain a measured amount of ambient light; and means for processing a video signal in dependence upon said measured amount of ambient light; wherein said processing means includes means for substantially immediately processing said video signal when there is a large change in said measured amount of ambient light; and means for delaying processing said video signal until an occurrence of a scene change in said video signal when there is a small change in said measured amount of ambient light.

A third aspect of the invention provides a display apparatus comprising an ambient light-dependent video-signal processing device as described above; and a display device for displaying the video signal processed by the ambient light-dependent video-signal processing device.

In a method of ambient light-dependent video-signal processing in accordance with a primary aspect of the present invention, the method comprising the steps of measuring an amount of ambient light to obtain a measured amount of ambient light, and processing a video signal in dependence upon the measured amount of ambient light, the video signal is substantially immediately processed when there is a large change in the measured amount of ambient light, while the video signal is delayed being processed until an occurrence of a scene change in the video signal when there is a small change in the measured amount of ambient light.

It is to be noted that PCT International Application No. WO-A-90/06035 corresponding to U.S. Pat. No. 5,087,973, discloses a picture receiver controller in which data signals are subjected to an operation in such a way that a noise reduction control signal is outputted in conformity with a noise level introduced during transfer or storing, further comprising means for updating the noise reduction control signal in synchronism with a scene change of an input image, so that a smooth noise reduction control can be performed when a detected noise level is quantized and controlled synchronously with a detected scene changing state. This document does not teach that the video signal is substantially immediately processed when there is a large change in the measured amount of ambient light, while the video signal is delayed being processed until an occurrence of a scene change when there is a small change in the measured amount of ambient light.

These and other aspects of the invention will be apparent from and elucidated with reference to the embodiments described hereinafter.

DESCRIPTION OF THE PREFERRED EMBODIMENT

Figure 1:
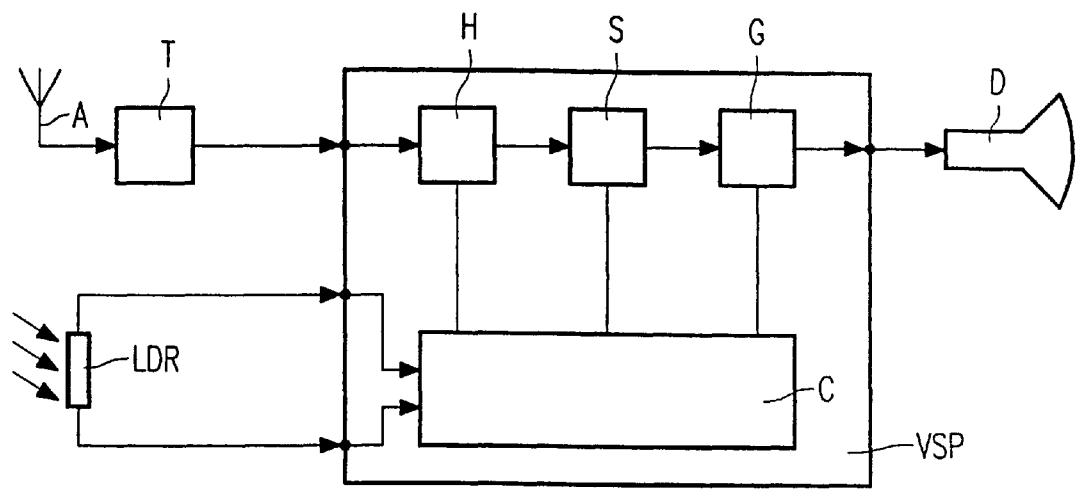
FIG. 1 shows an embodiment of a display apparatus in accordance with the present invention.

FIG. 1 shows an embodiment of a display apparatus in accordance with the present invention. An antenna A picks up a television signal and applies it to a tuner T which furnishes a baseband video signal. An ambient light-dependent video-signal processor VSP processes the video signal received from the tuner T and applies a processed video signal to a display device D.

The ambient light-dependent video-signal processor VSP receives a signal indicating a measured amount of ambient light from a light-dependent resistor LDR or some other light sensor, such as a photo diode. The measured amount of ambient light-indicating signal is applied to a control circuit C, which furnishes control signals to a cascade connection of a histogram-based processing circuit H, a saturation control circuit S, and a gain circuit (variable amplifier) G, these circuits H, S and G processing the video signal in the ambient light-dependent video-signal processor VSP.

The control circuit C controls the circuits H, S and G in such a manner that the video signal is substantially immediately processed when there is a large change in the measured amount of ambient light, while the video signal is delayed being processed until an occurrence of a scene change in the video signal when there is a small change in the measured amount of ambient light. The scene change dependency prevents ambient light-dependent control-setting changes from becoming annoyingly visible, while large control-setting changes (the light in the room is turned on/off, the sun hides behind a cloud, or reappears from behind a cloud) are immediately effected so that the person watching the TV continues to have optimum viewing conditions.

When there is a large change in the measured amount of ambient light, a first large adjustment is made, followed by a small adjustment completing the adjustment necessary in view of the large change in the measured amount of ambient light. In this manner, the control speed of the ambient light control is matched with the adaptation speed of the human eye. By matching the control speed to the eye, the visibility of the control can be diminished. Experiments proved that, when the lights in a room are switched off, it takes some minutes for the eye to get used to the new situation. If the TV picture reduces its contrast much faster, this may lead to irritation because the picture may look dull for a few minutes. In this embodiment, the small adjustment is preferably effected upon an occurrence of a scene change. Mainly going from light to dark, the eye can be quite slow, so that the necessary adjustment is preferably only divided into an immediate large adjustment followed by a small complementary adjustment if the measured amount of ambient light undergoes a large change from light to dark.

Figure 2:
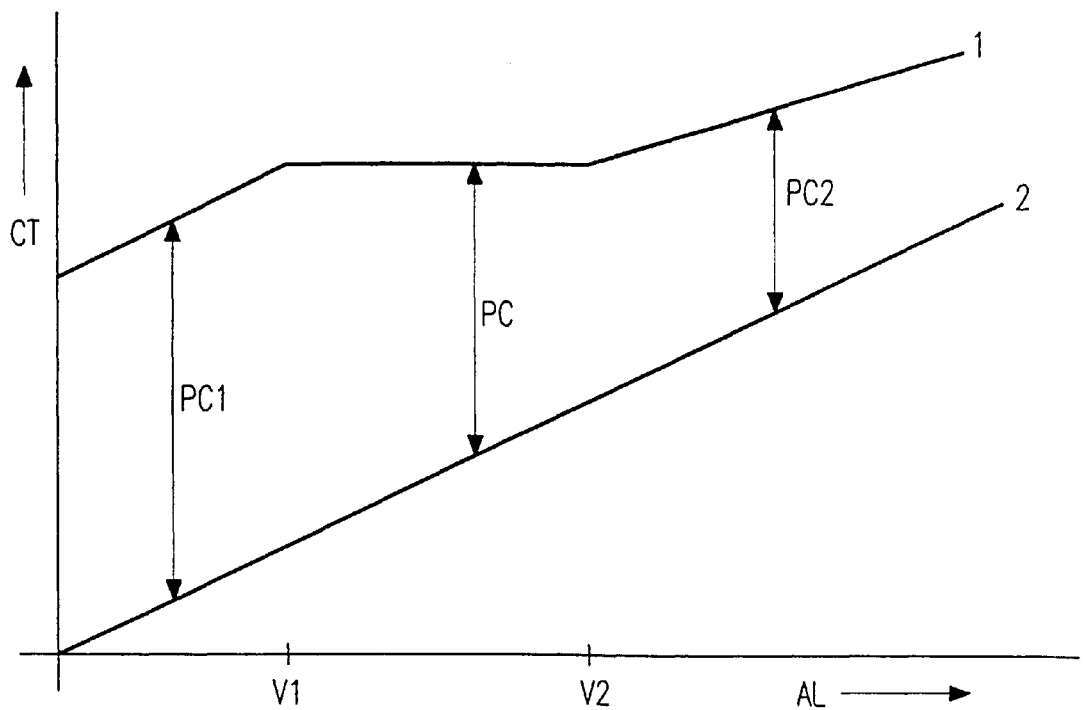
FIG. 2 is a graph (contrast versus ambient light) illustrating the operation of an embodiment of an ambient light-dependent video-signal processor in accordance with the present invention.

FIG. 2 is a graph (contrast versus ambient light) illustrating the operation of an embodiment of an ambient light-dependent video-signal processor in accordance with the present invention. Ambient light (AL) is plotted (logarithmically) on the horizontal axis, while contrast CT is plotted (logarithmically) on the vertical axis. The upper curve 1 shows how contrast is changed by gain adaptation (up to a first ambient light value V1), by doing nothing (between V1 and V2) as the maximum amount of global contrast achievable by the display and the gain circuit has already been achieved, and by histogram/saturation adaptation (from a second ambient light value V2). The lower curve 2 illustrates how an increasing amount of ambient light deteriorates the perceived contrast PC for the user, as the perceived contrast PC is the difference between the curves 1 and 2: it can easily be seen that, from V1, when the gain is maximum, an increasing amount of ambient light results in a decreasing distance between the curves 1 and 2, i.e. in a reduced amount of perceived contrast. The arrow PC1 illustrates the amount of perceived contrast at a low amount of ambient light AL, while the arrow PC2 illustrates the amount of perceived contrast at a high amount of ambient light AL.

In the ambient light range up to the first ambient light value V1, contrast changes are preferably effected in dependence upon the amount of ambient light by modifying the gain by means of the gain circuit (variable amplifier) G. This is based on the following considerations. Present-day TV sets have a high peak-white output. When the viewer is present in dark surroundings (and his/her eyes are adapted to the dark), this high peak-white output can become tiring. Under dark ambient conditions, it is therefore better to reduce the contrast to some extent. The resulting image is less fatiguing to the eye. It appears that, only when the measured amount of ambient light is below the first given value V1, it was necessary to delay the ambient light-dependent video-signal processing until the occurrence of a scene change.

In the ambient light range from the second ambient light value V2, contrast changes are preferably effected in dependence upon the amount of ambient light by means of the histogram-based processing circuit (non-linear amplifier) H of FIG. 1. Preferably, a circuit of the type set out in U.S. Pat. No. 5,537,071 and EP-A-0,648,043, corresponding to U.S. Pat. No. 5,734,746 is used for this purpose. An ordinary amplifier easily allows reduction of the contrast when the ambient light diminishes. However, if more light from the display device D is required when the ambient light exceeds the value V2, this requirement can often not be met because the total light output of the display device D is already at its maximum value. In such circumstances, a further locally perceived contrast increase can still be obtained by means of the histogram-based processor H because such a circuit can highlight interesting parts (luminance levels) in the picture to the detriment of less interesting parts, so that the locally perceived contrast is still increased while the total light output of the display device D remains at about the same level. This mechanism is very well suited for ambient light control under bright conditions because, when there is much ambient light, the viewer is no longer interested in the details (background etc.), but just wants to see what is going on. Under extreme ambient light conditions, the natural appearance of the picture is no longer relevant or interesting and even extreme non-linear amplifier settings are allowed.

Under high ambient light conditions, there are many reflections coming back from the TV screen. These reflections are mainly whitish. This results in a perceived decrease of the saturation of the television picture. To compensate for this effect, the saturation (controlled by saturation control circuit S) should slightly increase at high ambient light conditions. A small correction (maximally 5 steps out of a 64 step control range) is therefore preferably added to a user setting.

It should be noted that the above-mentioned embodiments illustrate rather than limit the invention, and that those skilled in the art will be able to design many alternative embodiments without departing from the scope of the appended claims. Any changes in the video-signal processing settings to be carried out upon an occurrence of a scene change may be subdivided into several partial setting changes which are carried out sequentially in response to sequential scene changes. The invention can be implemented by means of hardware comprising several distinct elements and by means of a suitably programmed computer. In the device claim enumerating several means, several of these means can be embodied by one and the same item of hardware.

What is claimed is:

1. An ambient light-dependent video-signal processing method comprising the steps:

measuring an amount of ambient light to obtain a measured amount of ambient light; and processing a video signal in dependence upon said measured amount of ambient light;

wherein said method further comprises the steps:

determining an amount of change in said measured amount of ambient light over a predetermined amount of time;

substantially immediately processing said video signal when the change in said measured amount of ambient light is greater than a first amount indicating a large change;

detecting a scene change in said video signal; and delaying processing said video signal until an occurrence of a scene change in said video signal when the change in said measured amount of ambient light is less than a second amount indicating a small change.

2. The method as claimed in claim 1, wherein when the change in said measured amount of ambient light is greater than said first amount, said processing step comprises the steps:

making a first large adjustment of the video signal; and making a small adjustment to complete processing of the video signal.

3. The method as claimed in claim 2, wherein said small adjustment is effected upon an occurrence of a scene change.

4. The method as claimed in claim 2, wherein said steps of making a first large adjustment, and then making a small adjustment, are only effected if the change in said measured amount of ambient light is greater than said first amount and is from light to dark.

5. The method as claimed in claim 1, wherein said ambient light-dependent video-signal processing is only delayed until the occurrence of a scene change when the measured amount of ambient light is below a first given value.

6. The method as claimed in claim 1, wherein said ambient light-dependent video-signal processing comprises adjusting a gain of the video signal when the measured amount of ambient light is below a second given value.

7. The method as claimed in claim 1, wherein said ambient light-dependent video-signal processing comprises a histogram-based operation when the measured amount of ambient light is above a third given value.

8. The method as claimed in claim 1, wherein said ambient light-dependent video-signal processing comprises adjusting a saturation level of said video signal when the measured amount of ambient light is above a fourth given value.

9. An ambient light-dependent video-signal processing device comprising:

means for measuring an amount of ambient light to obtain a measured amount of ambient light; and means for processing a video signal in dependence upon said measured amount of ambient light;

wherein said processing device further comprises:

means for determining an amount of a change in said measured amount of ambient light over a predetermined amount of time;

means for substantially immediately processing said video signal the change in said measured amount of ambient light is greater than a first amount indicating a large change;

means for detecting a scene change in said video signal; and means for delaying processing said video signal until an occurrence of a scene change in said video signal when the change in said measured amount of ambient light is less than a second amount indicating a small change.

10. A display apparatus, comprising:

an ambient light-dependent video-signal processing device as claimed in claim 9; and a display device for displaying the video signal processed by the ambient light-dependent video-signal processing device.

* * * * *